US012797873B2

(12) United States Patent
Chiu

(10) Patent No.: US 12,797,873 B2
(45) Date of Patent: Nov. 17, 2026

(54) GEAR MOVEMENT GROUP FOR GREASE IRRIGATION

(71) Applicant: Ningbo Ditai Plastic Co., Ltd., Ningbo City (CN)

(72) Inventor: Shih-Feng Chiu, Ningbo City (CN)

(73) Assignee: Ningbo Ditai Plastic Co., Ltd., Ningo City (CN)

( * ) Notice: Subject to any disclaimer, the term of this patent is extended or adjusted under 35 U.S.C. 154(b) by 183 days.

(21) Appl. No.: 19/036,209

(22) Filed: Jan. 24, 2025

(65) Prior Publication Data

US 2026/0158508 A1 Jun. 11, 2026

(30) Foreign Application Priority Data

Dec. 11, 2024 (CN) ......................... 202423060776.0

(51) Int. Cl.
*B05B 3/04* (2006.01)

(52) U.S. Cl.
CPC .................................. *B05B 3/0417* (2025.08)

(58) Field of Classification Search
CPC B05B 3/02; B05B 3/025; B05B 3/026; B05B 3/027; B05B 3/04; B05B 3/0417; B05B 3/0429; B05B 3/043; B05B 3/0432; B05B 3/0435; B05B 3/0461; B05B 15/74; B05B 3/16; B05B 3/00; B05B 1/1887; B05B 12/00; B05B 12/16; B05B 3/0446; F16K 31/12; F16K 31/126; F16K 31/36; F16K 31/38; F16K 31/53; F16K 31/44; F16K 31/535; F16K 31/54; F16K 31/52416; F16K 31/52441; F16K 31/52408
USPC .......................................................... 239/240
See application file for complete search history.

(56) References Cited

U.S. PATENT DOCUMENTS

2007/0119978 A1* 5/2007 Wang .................... B05B 3/0435 239/242
2009/0014553 A1* 1/2009 Wang .................... B05B 3/0438 239/237
2011/0259977 A1* 10/2011 Lo ......................... B05B 3/0417 239/240
2017/0028427 A1* 2/2017 Hung ...................... F16K 31/16
2019/0000023 A1* 1/2019 Chen ......................... B05B 3/16
2019/0374960 A1* 12/2019 Nies ...................... B05B 3/0438

* cited by examiner

*Primary Examiner* — Cody J Lieuwen
*Assistant Examiner* — Juan C Barrera
(74) *Attorney, Agent, or Firm* — Wang Law Firm, Inc.

(57) ABSTRACT

A gear movement group for grease irrigation comprises a main housing composed of a main body and a housing cover which are connected to each other. The main housing has a water inlet and a water outlet respectively located at the front end and the rear end of the main housing. The main housing has an oil-added chamber for allowing a transmission assembly to be mounted in. A water inlet pipe having an inner end is disposed at the water inlet of the main housing and a toothed shaft at the inner end of the water inlet pipe is in connection to the transmission assembly. A water chamber is defined inside the main housing adjacent to the water outlet. An impeller disposed inside the water chamber is in transmission connected to the transmission assembly via a gear shaft. A water inlet mechanism is disposed inside the main housing.

13 Claims, 6 Drawing Sheets

GEAR MOVEMENT GROUP FOR GREASE IRRIGATION

TECHNICAL FIELD OF THE INVENTION

The present invention relates to a field of sprinklers, and in particular to a gear movement group for grease irrigation.

BACKGROUND OF THE INVENTION

Sprinklers are a kind of tools for irrigating plants in the farmland or forest garden. With the improvement of the living environment and the increase of the greening rate of urban parks, sprinklers have been widely used. By using sprinklers of irrigation, the manpower is saved, and the irrigation efficiency is greatly improved. The water inlet mechanism in the existing sprinkler usually uses a long spring as a tool to adjust the direction, but the long spring is easy to be damaged due to metal fatigue and excessive use after long-time operation. Therefore, a water inlet mechanism with reliable mechanism and long service life is needed in the market to help users to reduce the frequency of maintenance and replacement and prolong the service life.

Upon searching, a Chinese patent CN210671562U (application No.: 201921337096.5) disclosed a sprinkler transmission mechanism enabling oil and water separation, comprising a main housing and a transmission assembly; wherein the main housing has a water inlet and a water outlet respectively located at front and rear ends of the main housing; a gear guard and a gear cover are hermetically connected to each other to define an oil addition chamber, the transmission assembly is disposed inside an oil addition chamber; a water inlet pipe having ana inner end is disposed at the water inlet; a toothed shaft at the inner end of the water inlet pipe is in transmission connection to the transmission assembly; an impeller disposed inside the main housing adjacent to the water outlet is in transmission connected to the transmission assembly in the oil addition chamber via a gear shaft; and a water inlet mechanism communicating with the water inlet pipe is disposed inside the main housing. When water flows in, the vanes are impacted by the water flow to drive the gear shaft to rotate so as to the transmission assembly to rotate and the toothed shaft to rotate synchronously, so that the main housing is driven to rotate. However, its disadvantage is as follows: the swayable function of the water inlet paddle controlled by the control lever is realized by a flexible torsion spring, and the torsion spring is easy to break after multiple sways, resulting in a product failure. Therefore, further improvements need to be made.

SUMMARY OF THE INVENTION

It is an object of the present invention to provide a gear movement group for grease irrigation, which enables more flexible angle adjustment of a steering mechanism in a water inlet mechanism by optimizing the water inlet mechanism, and thus protects a spring from damage and prolongs the service life of the whole gear movement group.

For achieving the above object, the gear movement group for grease irrigation comprises a main housing having a front end and a rear end; a transmission assembly disposed inside the main housing; a gear housing and a gear cover disposed inside the main housing; wherein, the main housing is composed of a main body and a housing cover which are hermetically connected to each other, the main housing has a water inlet and a water outlet respectively located at the front end and the rear end of the main housing; the gear housing and the gear cover are hermetically connected to each other to define an oil-added chamber between the gear housing and the gear cover, the transmission assembly is disposed inside the oil-added chamber; a water inlet pipe having an inner end is disposed at the water inlet of the main housing and the inner end of the water inlet pipe extends into the main housing, and a toothed shaft at the inner end of the water inlet pipe is in transmission connection to the transmission assembly; a water chamber is defined inside the main housing adjacent to the water outlet, an impeller disposed inside the water chamber is in transmission connected to the transmission assembly via a gear shaft; a water inlet mechanism for communicating the water inlet pipe with the water chamber is disposed inside the main housing, the water inlet mechanism comprises a swayable water inlet paddle, a base located inside the main body, two hollow water inlet columns disposed axially at an inner side of the base away from the gear housing, a U-shaped support seat disposed between the two water inlet columns for allowing the water inlet paddle to reset against and tilt laterally, and a control lever being inserted into a mounting hole which is formed at the housing cover at a position corresponding to a position of the water inlet paddle; each water inlet column has a top opening and has a water outlet hole at a rear end of the water inlet column, the water inlet paddle has a left end) and a right end which are respectively located above the top opening of each respective water inlet column; the water inlet mechanism further comprises a rotatable head with an arc-shaped bottom resisting against the water inlet paddle, the water inlet paddle has a limiting recess on a top of the water inlet paddle for receiving the bottom of the rotatable head, the bottom of the rotatable head is slidable leftward and rightward inside the limiting recess to tilt the left end and the right end of the water inlet paddle upward and downward, so as to cover one of the two water inlet columns by the water inlet paddle to control water to only enter into one of the two water inlet columns when the water flows into the water inlet mechanism; the control lever has a spring hole on a bottom of the control lever for receiving a top end of a spring, and a bottom end of the spring resists against the rotatable head to urge the rotatable head against the limiting recess of the water inlet paddle.

Preferably, the water inlet paddle has a first cover portion at the left end and a second cover portion at the right end; an edge of the top opening of each water inlet column is inclined to be identical with the corresponding inclination angle of the first cover portion or the second cover portion of the swayable water inlet paddle, so as to make the first cover portion or the second cover portion of the swayable water inlet paddle capable of sealing the top opening of one of the two water inlet columns.

Preferably, the U-shaped support seat has a blade on a bottom surface of the U-shaped support seat, and the blade resists against a bottom of the water inlet paddle, so as to improve the flexibly of the water inlet paddle when tilting laterally.

Preferably, the water inlet paddle has two support columns each with an arc-shaped bottom surface respectively located on two sides of a middle portion of the water inlet paddle, the U-shaped support seat has two U-shaped grooves for receiving the two support columns, the two support columns are rotatable and supported by the U-shaped support seat so as to allow the water inlet paddle to tilt laterally on the U-shaped support seat, so that the water inlet paddle is more stable and reliable when tilting laterally.

Preferably, the rotatable head is a tapered cylinder, and a diameter of a top of the rotatable head is smaller than a diameter of a bottom of the rotatable head.

Preferably, the main housing is a cylinder which is composed of the cylindrical main body and the housing cover which are connected together, the main body has an opening at a front end of the main body and the water outlet on a rear end of the main body, the housing cover is hermetically covered on the front end of the main body and has the water inlet on a surface of the housing cover.

Preferably, the gear housing has an oval cross-section, a bottom surface of the gear housing extends outward to form the base to be matched with an inner wall of the main body, a step for positioning the base is formed inside the main body adjacent to a bottom of the main body, the base has a through hole for allowing the gear shaft to pass through at a center of the base, the impeller is disposed inside the main housing at an outer side of the base to be connected to the gear shaft, and a gasket, a bushing and an oil seal for sealing are disposed within the through hole of the base.

Preferably, the transmission assembly comprises six transmission gears and two shafts, the six transmission gears are duplex gears; a first gear, a second gear and a third gear are respectively mounted on a first shaft in sequence; a fourth gear, a fifth gear and a sixth gear are respectively mounted on a second shaft in sequence, and the teeth of each gear overlap such that the first gear engages with the gear shaft and the fourth gear, the fourth gear engages with the first gear and the second gear, the second gear engages with the fourth gear and the fifth gear, the fifth gear engages with the second gear and the third gear, the third gear engages with the fifth gear and the sixth gear, and the sixth gear engages with the third gear and the teeth of the toothed shaft.

Preferably, the gear housing and the gear cover have two shaft holes respectively formed at the gear housing and the gear cover for allowing the first shaft and the second shaft to be mounted; a small gear extending out of the gear cover to be engaged with the toothed shaft is disposed adjacent to the sixth gear, the gear cover has a hole for the small gear to extend outward and a V-shaped ring for better sealing is disposed at the hole of the gear cover, an O-shaped ring s lined between the sixth gear and the second shaft.

Preferably, each water inlet column has a slope which inclines downward and outward to a periphery of the base, an arc-shaped water guide plate communicating with the water inlet columns extends outward from a surface of the base at an outer side of base corresponding to an outer side of the impeller.

Preferably, the base has left and right water inlet holes on the surface of the base, two pressure relief nails are respectively disposed at each water inlet hole, and reset springs for allowing the pressure relief nails to close the water inlet holes are sleeved outside the pressure relief nails; when water pressure is low, the pressure relief nails are not pushed open, and, when the water pressure of water that flows into the main housing reaches a certain value, the pressure relief nails are pushed open.

Preferably, a positioning column is protruded from at an end of the toothed shaft of the water inlet pipe, correspondingly, the gear cover has a concave positioning hole for receiving the positioning column, the water inlet pipe being connected to the water inlet is connected to the main body through the cooperation of the toothed shaft with the sixth gear and the cooperation of the positioning column with the positioning hole, a sealing ring is lined between the water inlet and the water inlet pipe.

Preferably, a first end of the gear shaft is inserted into a center of the impeller, and a second end thereof drives the transmission assembly to rotate, and the toothed shaft rotates synchronously, enabling relative rotation between the main body and the housing cover.

Compared with the prior art, the gear movement group for grease irrigation of the present invention has the following advantages. The control lever has the spring hole on the bottom of the control lever for receiving the top end of a spring. The water inlet paddle is connected to the control lever via the rotatable head and the spring, and the rotatable head is capable of being slidable inside the limiting recess, so that the water inlet paddle is capable of tilting laterally inside the U-shaped support seat via a cooperation between the rotatable head and the spring. Moreover, since the spring is short, the spring is less deformed during the reciprocating rotation and is difficult to be damaged, so that the service life of the whole gear group is prolonged, the structure is more reasonable, and it is easy to assemble.

The reference numbers and the corresponding names of components are listed as below:

1—main housing; 2—transmission assembly; 3—water inlet; 4—water outlet; 5—gear housing; 6—gear cover; 7—water inlet pipe; 8—water inlet paddle; 8*a*—left end; 8*b*—right end; 9—toothed shaft; 10—impeller; 11—gear shaft; 12—base; 13—water inlet column; 14—U-shaped support seat; 15—main body; 16—housing cover; 17—mounting hole; 18—control lever; 19—blade; 20—limiting recess; 21—rotatable head; 22—spring hole; 23—spring; 24—small gear; 25—water inlet hole; 26—pressure relief nail; 27—reset spring; 28—first shaft; 29—second shaft; 30—first gear; 31—second gear; 32—third gear; 33—fourth gear; 34—fifth gear; 35—sixth gear; 36—water guide plate; 37—support column; 38—U-shaped groove; 39—step; 40—through hole; 41—water chamber; 42—positioning column; 43—oil-added chamber; 44—inlet; 45—water outlet hole; 46—O-shaped ring; 47—gasket; 48—bushing; 49—oil seal; A—water inlet mechanism; 61—positioning hole.

DETAILED DESCRIPTION OF THE INVENTION

The present invention will be further described below in detail by embodiments with reference to the accompanying drawings. The following embodiments are used to illustrate the invention, but cannot be used to limit the scope of the invention. In the description of the invention, unless otherwise stated, "multiple" means two or more; The orientation or position relationship indicated by the terms "up", "down", "left", "right", "inside", "outside", "front end", "back end", "head", "tail", etc., is based on the orientation or position relationship shown in the attached figure only for the purpose of facilitating the description of the invention and simplifying the description. It is not indicated or implied that the device or component referred to must have a specific orientation, construction and operation in a specific orientation, and therefore cannot be understood as a limitation of the invention. In addition, the terms "first", "second", "third", etc. are used for descriptive purposes only and are not to be understood as indicating or implying relative importance.

In the description of the invention, it needs to be stated that, unless otherwise clearly specified and limited, the terms "connection" and "connection" should be broadly understood, for example, it can be a fixed connection, it can also be a detachable connection, or a unified connection; a mechanical connection, or an electrical connection. It can be directly connected or indirectly connected through an intermediary. For ordinary technical personnel in this field, the specific meaning of the above terms in the present invention can be understood in specific circumstances.

Figure 1:
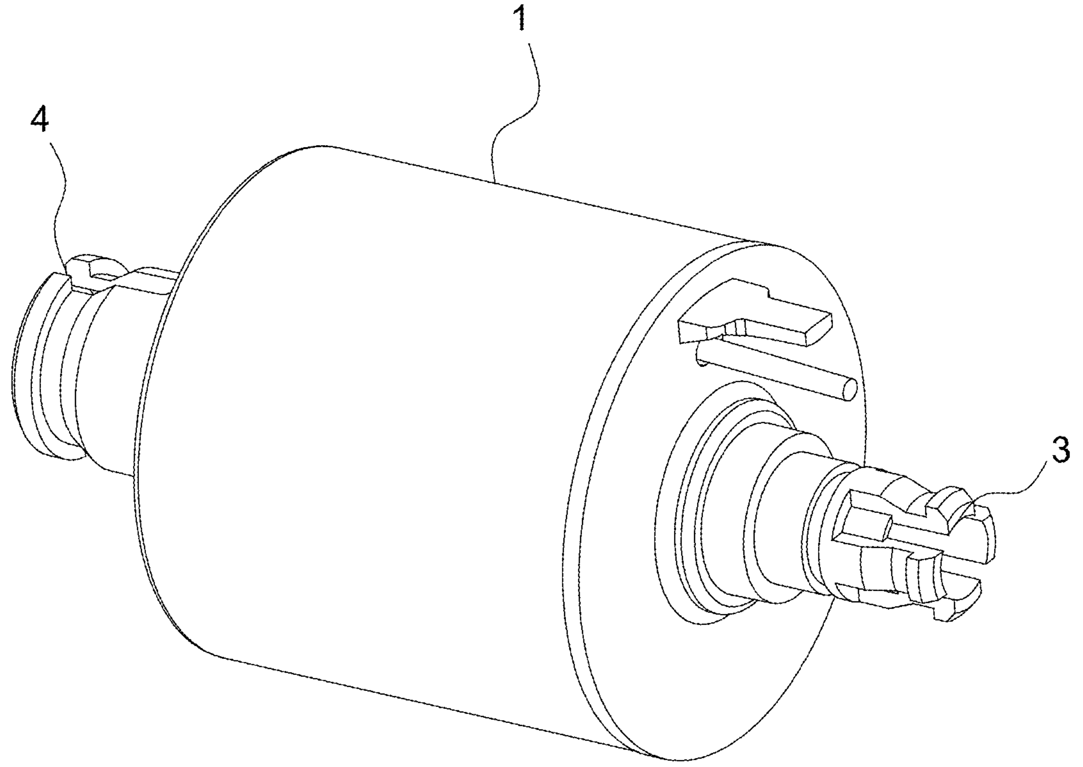
FIG. 1 is a perspective view of a gear movement group for grease irrigation according to an embodiment of the present invention.
Figure 2:
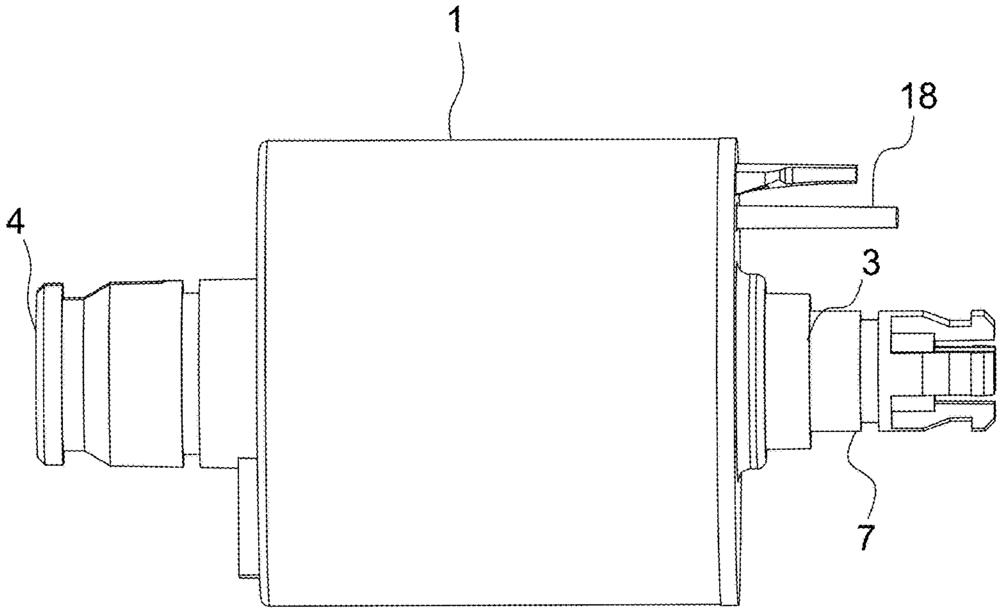
FIG. 2 is a side view of the gear movement group according to the embodiment of the present invention.
Figure 3:
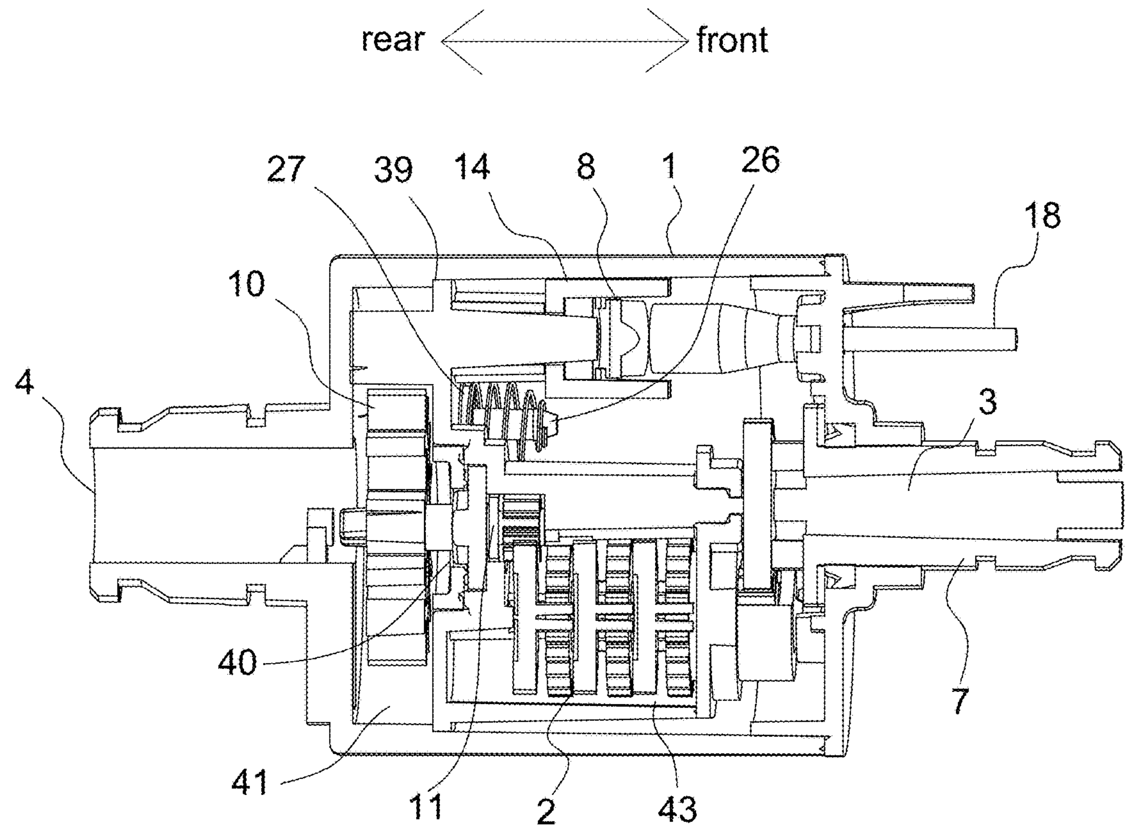
FIG. 3 is a vertical sectional view of FIG. 2.
Figure 4:
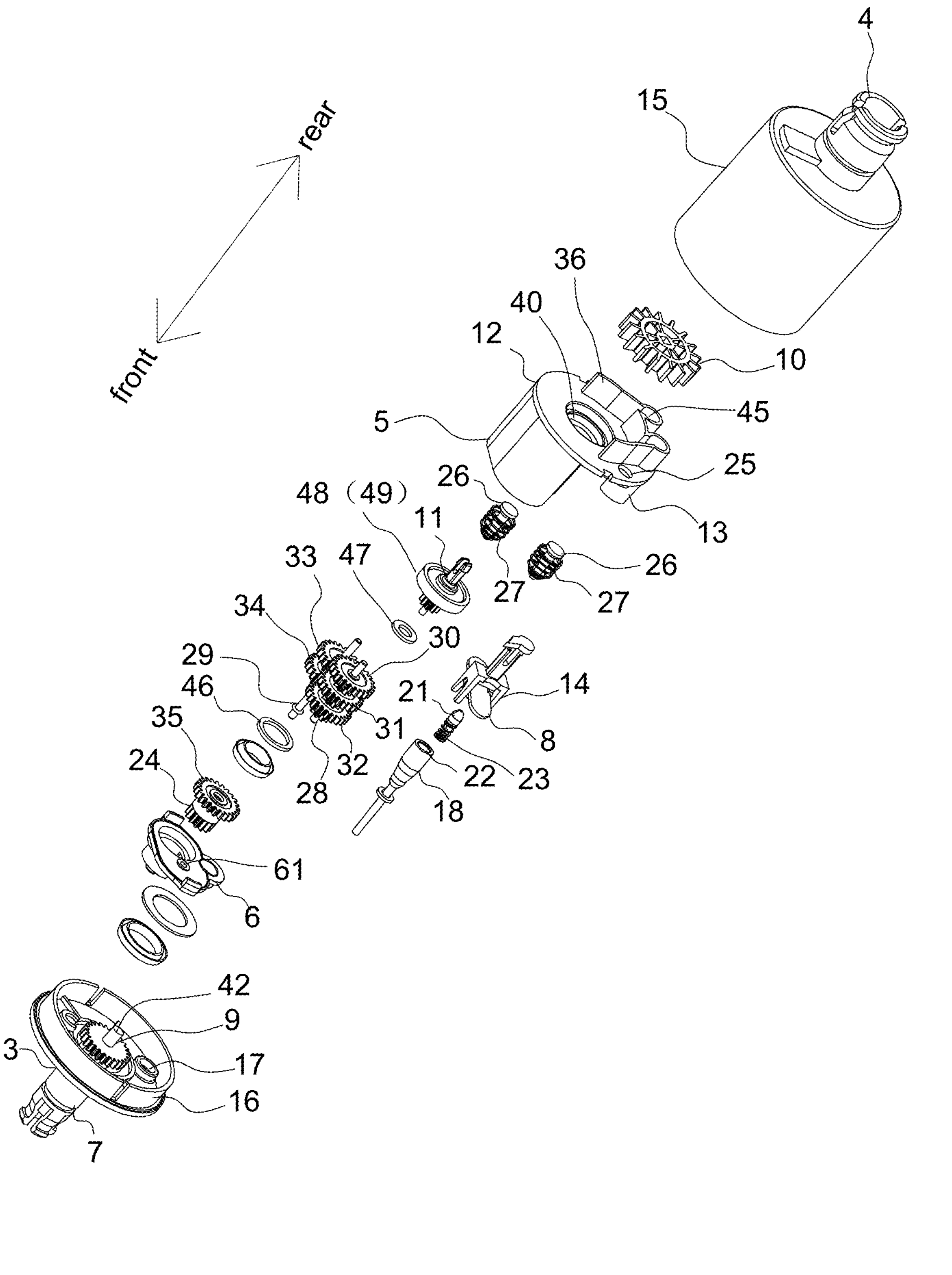
FIG. 4 is an exploded view of the gear movement group according to the embodiment of the present invention.
Figure 5:
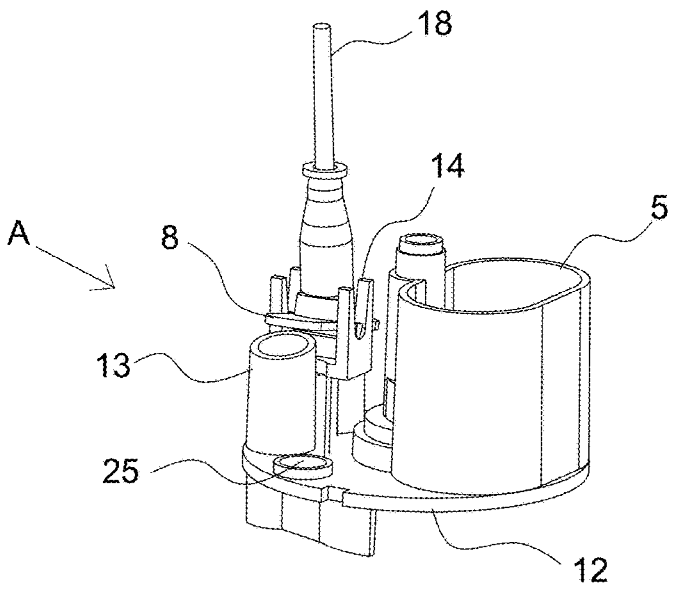
FIG. 5 is a perspective view of a water inlet mechanism and a transmission assembly according to the embodiment of the present invention.
Figure 6:
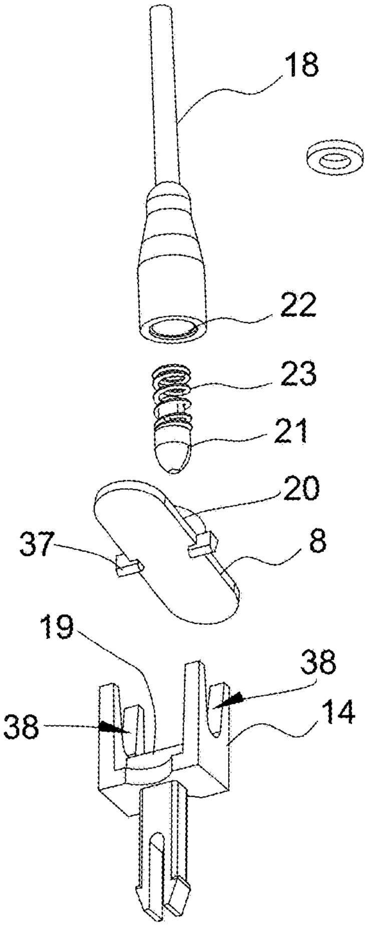
FIG. 6 is an exploded view of a part of the water inlet mechanism and a transmission assembly.
Figure 7:
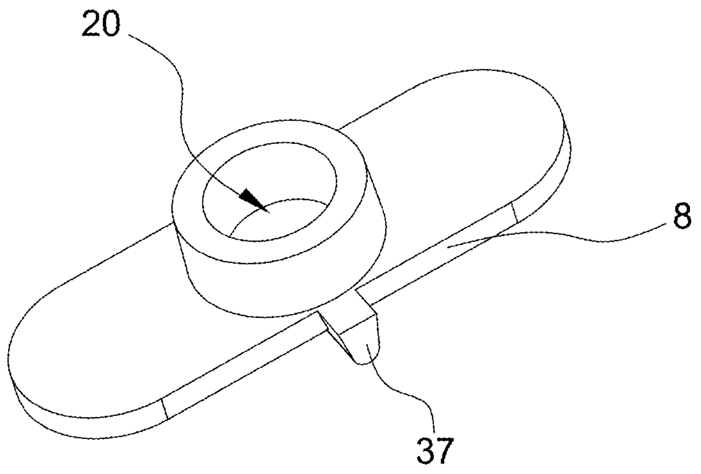
FIG. 7 is a perspective view of a water inlet paddle of the water inlet mechanism.
Figure 8:
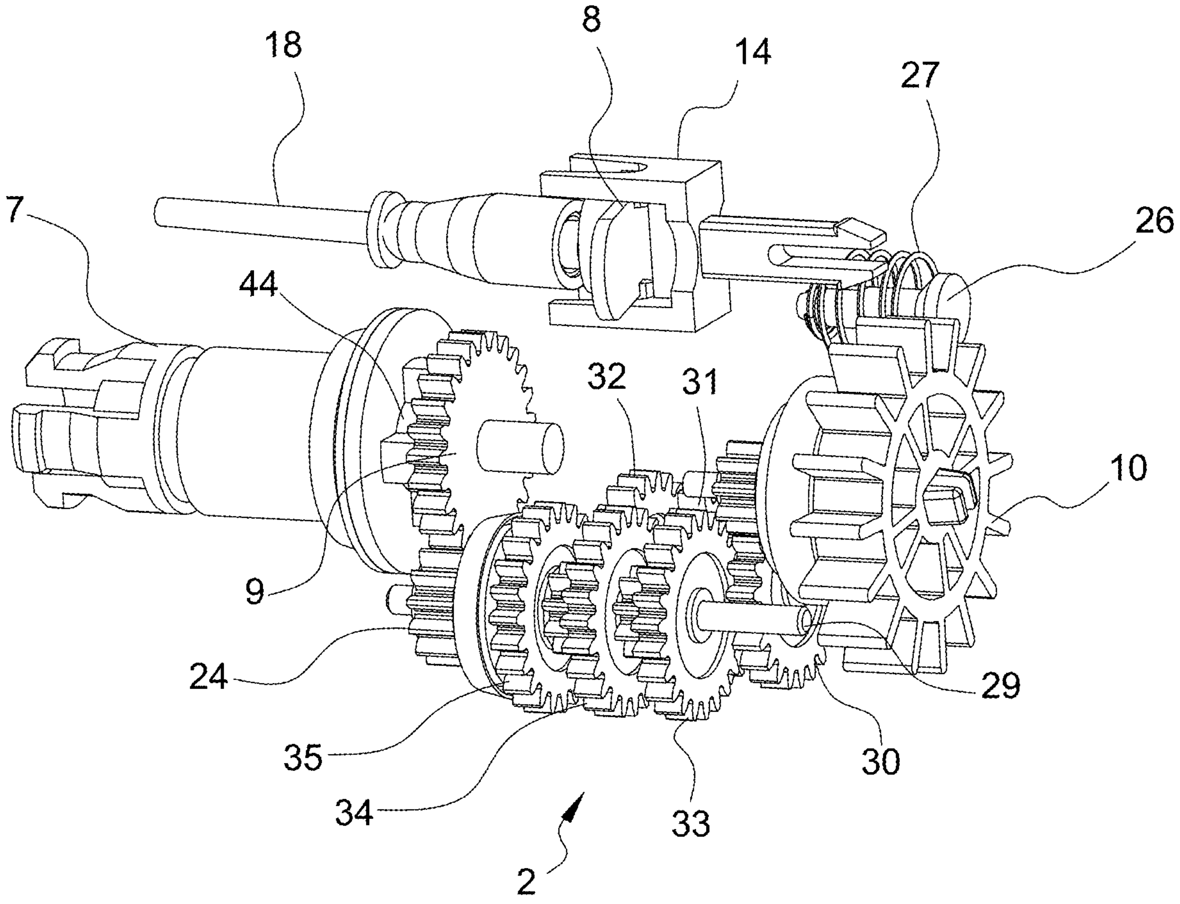
FIG. 8 is a perspective view of main components of the gear movement group when a main housing, a base, a gear housing and a gear cover are removed.
Figure 9:
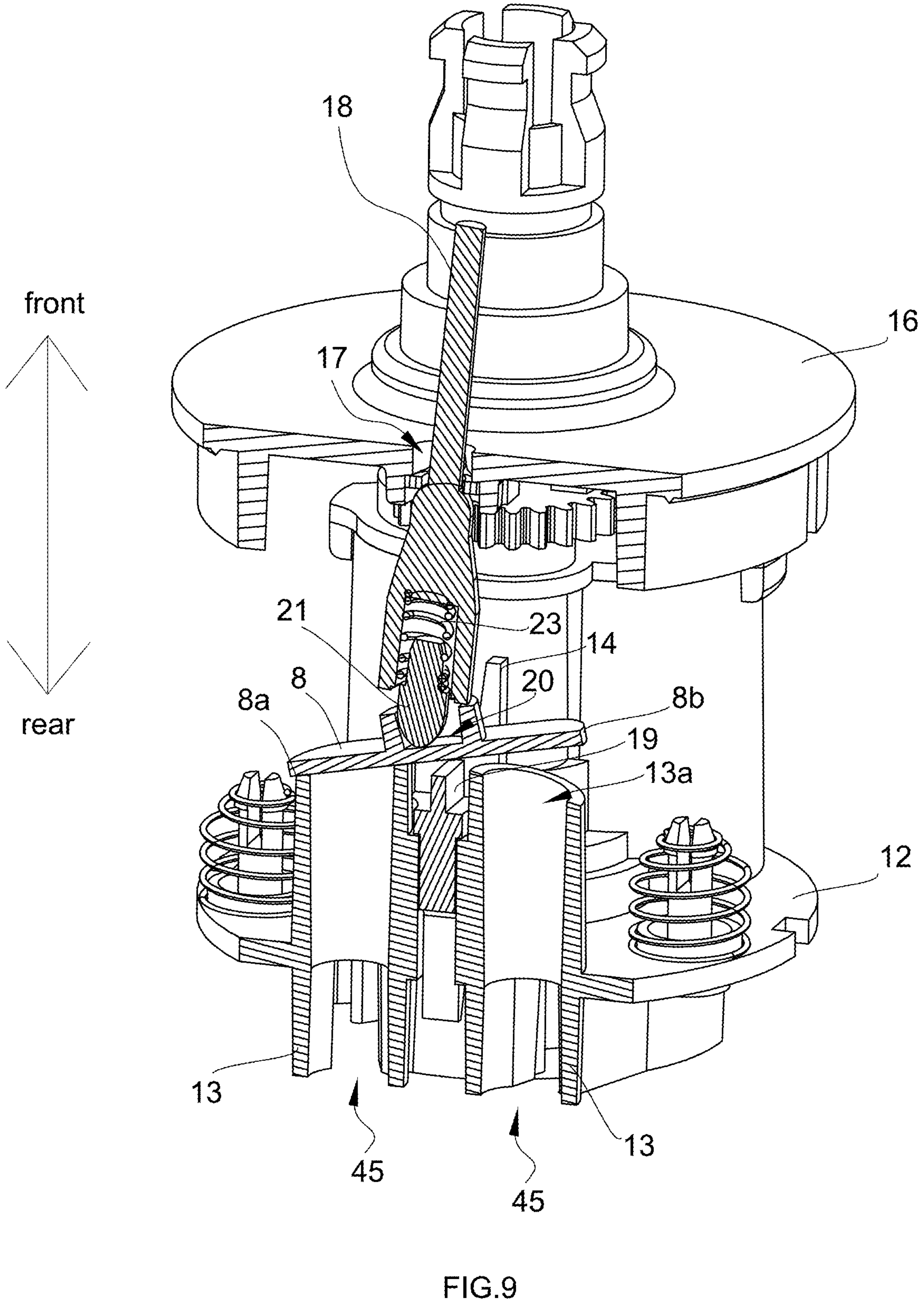
FIG. 9 is a perspective view of the gear movement group when a part of the gear movement group is cut off according to the embodiment of the present invention.

FIGS. 1-8 show a preferred embodiment of a gear movement group for grease irrigation of the present invention. The gear movement group comprises a main housing 1 having a front end and a rear end and a transmission assembly 2 disposed inside the main housing 1. The main housing 1 is composed of a main body 15 and a housing cover 16 which are hermetically connected to each other. The main housing 1 has a water inlet 3 and a water outlet 4 respectively located at the front end and the rear end of the main housing 1. The gear housing 5 and the gear cover 6 are hermetically connected to each other to define an oil-added chamber 43 between the gear housing 5 and the gear cover 6. The transmission assembly 2 is disposed inside the oil-added chamber 43. A water inlet pipe 7 having an inner end is disposed at the water inlet 3 of the main housing 1 and the inner end of the water inlet pipe 7 extends into the main housing 1, and a toothed shaft 9 at the inner end of the water inlet pipe 7 is in transmission connection to the transmission assembly 2. A water chamber 41 is defined inside the main housing 1 adjacent to the water outlet 4. An impeller 10 disposed inside the water chamber 41 is in transmission connected to the transmission assembly 2 via a gear shaft 11. A water inlet mechanism A for communicating the water inlet pipe 7 with the water chamber 41 is disposed inside the main housing 1. The water inlet mechanism A comprises a swayable water inlet paddle 8. A base 12 is located inside the main body 15, two hollow water inlet columns 13 are disposed axially at an inner side of the base 12 away from the gear housing 5, and a U-shaped support seat 14 is disposed between the two water inlet columns 13 for allowing the water inlet paddle 8 to reset against and tilt laterally. A control lever 18 is inserted into a mounting hole 17 which is formed at the housing cover 16 at a position corresponding to a position of the water inlet paddle 8. Each water inlet column 13 has a top opening 13*a* and has a water outlet hole 45 at a rear end of the water inlet column 13. The water inlet paddle 8 has a left end 8*a* and a right end 8*b* which are respectively located above the top opening 13*a* of each respective water inlet column 13; in detail, the water inlet paddle 8 has a first cover portion at the left end 8*a* and a second cover portion at the right end 8*b*. The water inlet mechanism A further comprises a rotatable head 21 with an arc-shaped bottom, may be a bullet-like bottom, resisting against the water inlet paddle 8. The water inlet paddle 8 has a limiting recess 20 on a top of the water inlet paddle 8 for receiving the bottom of the rotatable head 21. The bullet-like bottom of the rotatable head 21 is slidable leftward and rightward inside the limiting recess 20. The rotatable head 21 is slidable leftward and rightward back and forth on either side of a central line (which corresponds to a position of a blade 19) of the limiting recess 20 to tilt the left end 8*a* and the right end 8*b* of the water inlet paddle 8 upward and downward (that is, the water inlet paddle 8 is capable of tilting like a seesaw along with the slidable rotatable head 21), so as to cover one of the two water inlet columns 13 by the water inlet paddle 8 to control water to only enter into one of the two water inlet columns 13 when the water flows into the water inlet mechanism A; in detail, an edge of the top opening 13*a* of each water inlet column 13 is inclined to be identical with the corresponding inclination angle of the first cover portion or the second cover portion of the swayable water inlet paddle 8, so as to make the first cover portion or the second cover portion of the swayable water inlet paddle 8 capable of sealing the top opening 13*a* of one of the two water inlet columns 13.

The control lever 18 has a spring hole 22 on a bottom of the control lever 18 for receiving a top end of a spring 23, and a bottom end of the spring 23 resists against the rotatable head 21 to urge the rotatable head 21 against the limiting recess 20 of the water inlet paddle 8. The rotatable head 21 is a tapered cylinder, and a diameter of a top of the rotatable head 21 is smaller than a diameter of a bottom of the rotatable head 21. The U-shaped support seat 14 has a blade 19 on a bottom surface of the U-shaped support seat 14, and the blade 19 resists against a bottom of the water inlet paddle 8.

Specifically, the main housing 1 is a cylinder which is composed of the cylindrical main body 15 and the housing cover 16 which are connected to each other, so that it is easy for the main body 15 and the housing cover 16 to rotate relative to each other. The main body 15 has an opening at a front end of the main body 15 and the water outlet 4 on a rear end of the main body 15. The housing cover 16 is hermetically covered on the front end of the main body 15 and has the water inlet 3 on the rear end of the housing cover 16. The water outlet 4 of the main housing 1 has a water outlet port at the water outlet 4 to be connected to the watering mechanism of the sprinkler. In order to further improve the action sensitivity of the steering mechanism and maintain good operation stability, the water inlet paddle 8 has two support columns 37 each with an arc-shaped bottom surface respectively located on two sides of a middle portion of the water inlet paddle 8, the U-shaped support seat 14 has two U-shaped grooves 38 for receiving the two support columns 37, the two support columns 37 are rotatable and supported by the U-shaped support seat 14 so as to allow the water inlet paddle 8 to tilt laterally on the U-shaped support seat 14.

The gear housing 5 has an oval cross-section, a bottom surface of the gear housing 5 extends outward to form the base 12 to be matched with an inner wall of the main body 15. Preferably, the base 12 and the main body 15 each has a circular shape. A step 39 for positioning the base 12 is formed inside the main body 15 adjacent to a bottom of the main body 15. The base 12 has a through hole 40 for allowing the gear shaft 11 to pass through at a center of the base 12 so as to facilitate transmission connection between the transmission assembly 2 and the impeller 10. The impeller 10 is disposed inside the main housing 1 at an outer side of the base 12 to be connected to the gear shaft 11, and a gasket 47, a bushing 48 and an oil seal 49 for sealing are disposed within the through hole 40 of the base 12, so that the base 12 and the main body 15 are sealed to form the chamber 41 for allowing the impeller 10 to rotate therein. The base 12 has left and right water inlet holes 25 on the surface of the base 12. Two pressure relief nails 26 are respectively disposed at each water inlet hole 25, and reset springs 27 for allowing the pressure relief nails 26 to close the water inlet holes 25 are sleeved outside the pressure relief nails 26. When water pressure is low, the pressure relief nails 26 are not pushed open, and, when the water pressure of water that flows into the main housing 1 reaches a certain value, the pressure relief nails 26 are pushed open. Thus, the chamber 41 for allowing the impeller 10 to rotate therein communicates the inside of the chamber 41 and the outside of the chamber 41 through the water inlet holes 25 and the water inlet columns 13. The pressure of outgoing water can be quickly relieved, and the gear movement group is prevented from being damaged by pressure.

The transmission assembly 2 comprises six transmission gears and two shafts, the six transmission gears are duplex gears. A first gear 30, a second gear 31 and a third gear 32 are respectively mounted on a first shaft 28 in sequence; a fourth gear 33, a fifth gear 34 and a sixth gear 35 are respectively mounted on a second shaft 29 in sequence, and the teeth of each gear overlap such that the first gear 30 engages with the gear shaft 11 and the fourth gear 33, the fourth gear 33 engages with the first gear 30 and the second gear 31, the second gear 31 engages with the fourth gear 33 and the fifth gear 34, the fifth gear 34 engages with the second gear 31 and the third gear 32, the third gear 32 engages with the fifth gear 34 and the sixth gear 35, and the sixth gear 35 engages with the third gear 32 and the teeth of the toothed shaft 9, thereby realizing the transmission power of the gear movement group. The gear housing 5 and the gear cover 6 have two shaft holes respectively formed at the gear housing 5 and the gear cover 6 for allowing the first shaft 28 and the second shaft 29 to be mounted. A small gear 24 extending out of the gear cover 6 to be engaged with the toothed shaft 9 is disposed adjacent to the sixth gear 35, the gear cover 6 has a hole for the small gear 24 to extend outward and a V-shaped ring for better sealing is disposed at the hole of the gear cover 6, an O-shaped ring 46 is lined between the sixth gear 35 and the second shaft 29.

Each water inlet column 13 has a slope which inclines downward and outward to a periphery of the base 12, an arc-shaped water guide plate 36 communicating with the water inlet columns 13 extends outward from a surface of the base 12 at an outer side of base 12 corresponding to an outer side of the impeller 10. A positioning column 42 is protruded from at an end of the toothed shaft 9 of the water inlet pipe 7, correspondingly, the gear cover 6 has a concave positioning hole 61 for receiving the positioning column 42. The water inlet pipe 7 being connected to the water inlet 3 is connected to the main body 15 through the cooperation of the toothed shaft 9 with the sixth gear 35 and the cooperation of the positioning column 42 with the positioning hole 61. A sealing ring is lined between the water inlet 3 and the water inlet pipe 7.

During operation, a water flow flows into the water inlet pipe 7, and the water inlet paddle 8 controls the water flow to enter the chamber 41 from only one of the water inlet columns 13 and pushes the impeller 10 to rotate so as to realize power and steering. When the water pressure is high and reaches a certain value, the pressure relief nails 26 are pushed open, and water enters into both the water columns 13 and the water inlet holes 25 at the same time, so that the pressure of outgoing water can be quickly relieved, and the gear movement group is prevented from being damaged by pressure.

Since the water inlet mechanism A of the gear movement group for grease irrigation of the present application has the new steering mechanism, flexible steering is assisted by the rotating head 21. Moreover, the support columns 37 and the U-shaped grooves 38 are matched to allow the water inlet paddle 8 to tilt laterally on the U-shaped support seat 14, the protective effect on the spring 23 can be greatly improved, and the spring 23 can be prevented from being twisted off, so that the service life of the whole gear movement group is prolonged.

The invention claimed is:

1. A gear movement group for grease irrigation, comprising:

a main housing having a front end and a rear end;

a transmission assembly disposed inside the main housing;

a gear housing and a gear cover disposed inside the main housing;

wherein, the main housing is composed of a main body and a housing cover which are hermetically connected to each other, the main housing has a water inlet and a water outlet respectively located at the front end and the rear end of the main housing;

the gear housing and the gear cover are hermetically connected to each other to define an oil-added chamber between the gear housing and the gear cover, the transmission assembly is disposed inside the oil-added chamber;

a water inlet pipe having an inner end is disposed at the water inlet of the main housing and the inner end of the water inlet pipe extends into the main housing, and a toothed shaft at the inner end of the water inlet pipe is in transmission connection to the transmission assembly;

a water chamber is defined inside the main housing adjacent to the water outlet, an impeller disposed inside the water chamber is in transmission connected to the transmission assembly via a gear shaft;

a water inlet mechanism for communicating the water inlet pipe with the water chamber is disposed inside the main housing, the water inlet mechanism comprises a swayable water inlet paddle, a base located inside the main body, two hollow water inlet columns disposed axially at an inner side of the base away from the gear housing, a U-shaped support seat disposed between the two water inlet columns for allowing the water inlet paddle to reset against and tilt laterally, and a control lever being inserted into a mounting hole which is formed at the housing cover at a position corresponding to a position of the water inlet paddle;

each water inlet column has a top opening and has a water outlet hole at a rear end of the water inlet column, the water inlet paddle has a left end and a right end which are respectively located above the top opening of each respective water inlet column;

the water inlet mechanism further comprise a rotatable head with an arc-shaped bottom resisting against the water inlet paddle, the water inlet paddle has a limiting recess on a top of the water inlet paddle for receiving the bottom of the rotatable head, the bottom of the rotatable head is slidable leftward and rightward inside the limiting recess to tilt the left end and the right end of the water inlet paddle upward and downward, so as to cover one of the two water inlet columns by the water inlet paddle to control water to only enter into one of the two water inlet columns when the water flows into the water inlet mechanism;

the control lever has a spring hole on a bottom of the control lever for receiving a top end of a spring, and a bottom end of the spring resists against the rotatable head to urge the rotatable head against the limiting recess of the water inlet paddle.

2. The gear movement group of claim 1, wherein the water inlet paddle has a first cover portion at the left end and a second cover portion at the right end;

an edge of the top opening of each water inlet column is inclined to be identical with the corresponding inclination angle of the first cover portion or the second cover portion of the swayable water inlet paddle, so as to make the first cover portion or the second cover portion of the swayable water inlet paddle capable of sealing the top opening of one of the two water inlet columns.

3. The gear movement group of claim 1, wherein the U-shaped support seat has a blade on a bottom surface of the U-shaped support seat, and the blade resists against a bottom of the water inlet paddle.

4. The gear movement group of claim 3, wherein the water inlet paddle has two support columns each with an arc-shaped bottom surface respectively located on two sides of a middle portion of the water inlet paddle, the U-shaped support seat has two U-shaped grooves for receiving the two support columns, the two support columns are rotatable and supported by the U-shaped support seat so as to allow the water inlet paddle to tilt laterally on the U-shaped support seat.

5. The gear movement group of claim 4, wherein the rotatable head is a tapered cylinder, and a diameter of a top of the rotatable head is smaller than a diameter of a bottom of the rotatable head.

6. The gear movement group of claim 1, wherein the main housing is a cylinder which is composed of the cylindrical main body and the housing cover which are connected together, the main body has an opening at a front end of the main body and the water outlet on a rear end of the main body, the housing cover is hermetically covered on the front end of the main body and has the water inlet on a surface of the housing cover.

7. The gear movement group of claim 1, wherein the gear housing has an oval cross-section, a bottom surface of the gear housing extends outward to form the base to be matched with an inner wall of the main body, a step for positioning the base is formed inside the main body adjacent to a bottom of the main body, the base has a through hole for allowing the gear shaft to pass through at a center of the base, the impeller is disposed inside the main housing at an outer side of the base to be connected to the gear shaft, and a gasket, a bushing and an oil seal for sealing are disposed within the through hole of the base.

8. The gear movement group of claim 1, wherein the transmission assembly comprises six transmission gears and two shafts, the six transmission gears are duplex gears;

a first gear, a second gear and a third gear are respectively mounted on a first shaft in sequence; a fourth gear, a fifth gear and a sixth gear are respectively mounted on a second shaft in sequence, and the teeth of each gear overlap such that the first gear engages with the gear shaft and the fourth gear, the fourth gear engages with the first gear and the second gear, the second gear engages with the fourth gear and the fifth gear, the fifth gear engages with the second gear and the third gear, the third gear engages with the fifth gear and the sixth gear, and the sixth gear engages with the third gear and the teeth of the toothed shaft.

9. The gear movement group of claim 8, wherein the gear housing and the gear cover have two shaft holes respectively formed at the gear housing and the gear cover for allowing the first shaft and the second shaft to be mounted;

a small gear extending out of the gear cover to be engaged with the toothed shaft is disposed adjacent to the sixth gear, the gear cover has a hole for the small gear to extend outward and a V-shaped ring for better sealing is disposed at the hole of the gear cover, an O-shaped ring is lined between the sixth gear and the second shaft.

10. The gear movement group of claim 8, wherein a positioning column is protruded from at an end of the toothed shaft of the water inlet pipe, correspondingly, the gear cover has a concave positioning hole for receiving the positioning column, the water inlet pipe being connected to the water inlet is connected to the main body through the cooperation of the toothed shaft with the sixth gear and the cooperation of the positioning column with the positioning hole, a sealing ring is lined between the water inlet and the water inlet pipe.

11. The gear movement group of claim 1, wherein each water inlet column has a slope which inclines downward and outward to a periphery of the base, an arc-shaped water guide plate communicating with the water inlet columns extends outward from a surface of the base at an outer side of base corresponding to an outer side of the impeller.

12. The gear movement group of claim 11, wherein the base has left and right water inlet holes on the surface of the base, two pressure relief nails are respectively disposed at each water inlet hole, and reset springs for allowing the pressure relief nails to close the water inlet holes are sleeved outside the pressure relief nails;

when water pressure is low, the pressure relief nails are not pushed open, and, when the water pressure of water that flows into the main housing reaches a certain value, the pressure relief nails are pushed open.

13. The gear movement group of claim 1, wherein a first end of the gear shaft is inserted into a center of the impeller, and a second end thereof drives the transmission assembly to rotate, and the toothed shaft rotates synchronously, enabling relative rotation between the main body and the housing cover.

* * * * *